(12) United States Patent
Challener et al.

(10) Patent No.: US 8,099,789 B2
(45) Date of Patent: Jan. 17, 2012

(54) APPARATUS AND METHOD FOR ENABLING APPLICATIONS ON A SECURITY PROCESSOR

(75) Inventors: David C. Challener, Raleigh, NC (US); John H. Nicholson, III, Durham, NC (US); Joseph Pennisi, Apex, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1007 days.

(21) Appl. No.: 11/529,795

(22) Filed: Sep. 29, 2006

(65) Prior Publication Data

US 2008/0104416 A1 May 1, 2008

(51) Int. Cl.
*G06F 21/00* (2006.01)
(52) U.S. Cl. ............ 726/30; 726/27; 726/28; 726/29
(58) Field of Classification Search ............ 726/30
See application file for complete search history.

(56) References Cited

U.S. PATENT DOCUMENTS

| | | | |
|---|---|---|---|
| 7,526,654 B2 * | 4/2009 | Charbonneau | 713/188 |
| 2003/0028807 A1 * | 2/2003 | Lawman et al. | 713/201 |
| 2003/0035547 A1 | 2/2003 | Newton | |
| 2003/0037237 A1 | 2/2003 | Abgrall et al. | |
| 2003/0053623 A1 | 3/2003 | McCanny et al. | |
| 2003/0081784 A1 | 5/2003 | Kallahalla et al. | |
| 2004/0003390 A1 * | 1/2004 | Canter et al. | 717/178 |
| 2004/0039924 A1 | 2/2004 | Baldwin et al. | |
| 2004/0243835 A1 | 12/2004 | Terzis et al. | |
| 2005/0071645 A1 | 3/2005 | Girouard et al. | |
| 2005/0086509 A1 | 4/2005 | Ranganathan | |
| 2005/0097343 A1 * | 5/2005 | Altenhofen | 713/191 |
| 2005/0131900 A1 * | 6/2005 | Palliyll et al. | 707/10 |
| 2005/0132182 A1 * | 6/2005 | Challener et al. | 713/150 |
| 2005/0132203 A1 | 6/2005 | Dharmarajan | |
| 2005/0138393 A1 | 6/2005 | Challener et al. | |
| 2005/0166051 A1 * | 7/2005 | Buer | 713/173 |

* cited by examiner

*Primary Examiner* — Nasser Moazzami
*Assistant Examiner* — Ghazal Shehni
(74) *Attorney, Agent, or Firm* — Sawyer Law Group, P.C.

(57) ABSTRACT

Method and apparatus for enabling applications on security processors of computer systems. In one aspect, a security processor apparatus includes a processor and a memory coupled to the processor and operative to store a secure table. The secure table stores different certified endorsement keys and different values, each value associated with one of the endorsement keys. Each stored value is derived from a different application that is certified by the associated endorsement key to be executed on the processor.

30 Claims, 4 Drawing Sheets

APPARATUS AND METHOD FOR ENABLING APPLICATIONS ON A SECURITY PROCESSOR

FIELD OF THE INVENTION

The present invention relates to securely protecting computer data, and more particularly to security processors provided in computer systems to implement security features.

BACKGROUND OF THE INVENTION

Security of information stored on computer systems is a primary concern. Many different techniques have been implemented to secure such information, from security application software installed on computer systems, to hardware keys required for access to information.

Another way to secure information is known as the Trusted Platform Module (TPM) specification from the Trusted Computing Group (TCG). In this specification, a standard chipset including a programmable microcontroller is provided on a computer's circuit board during manufacturing, and is used to store and secure information of the computer system that is desired to be protected, i.e., enable effective trusted computing features. The security architecture (i.e., the functions and the application program interface (API)) that runs on the microcontroller, can be referred to as a TPM. A TPM can offer a variety of features, including a random number generator, facilities for secure generation of cryptographic keys, and abilities to limit the use of keys, e.g., to signing and verification, and/or encryption and decryption.

As e-commerce, e-government and e-business grows with the increasing threat of cybercrime, there is a tradeoff emerging in the use of security technologies for protecting data and authenticating identities and transactions. Information technology owners of processes involving these identities and transactions desire to use specific encryption algorithms tailored to their own circumstances and risk profiles. They want to use specific, feature set implementations of TPMs associated with desired encryption algorithms to support the required assurance level of their end-to-end systems and operational models. For example, a standard general purpose TPM may use a particular set of encryption algorithms including the Advanced Encryption Standard (AES). However, particular governmental organizations may use different algorithms than AES, such as the government of Russia using GOST (Gosudarstvennyi Standart) encryption or the government of China using SMS4 encryption. Others, such as the National Security Agency of the United States, may use their own algorithms which they do not wish to publicly disclose.

Such different requirements by different entities would typically require that each TPM chipset be specifically tailored for the security architecture and algorithms desired by its particular end-user. Thus, a different security architecture implementing particular hashing and encryption algorithms and other functionality will have to be loaded on different TPM chipsets before delivery to the end user. This requires that a different TPM chip be made for each different user specification, which can greatly increase the cost of manufacture of TPMs and thus the cost for the user to install this type of security on their systems.

In addition, prior implementations of TPM chips have not allowed a TPM architecture to be securely unloaded from the microcontroller to allow the loading of other applications on the chip, nor have they allowed the most recent version of an unloaded TPM architecture to be securely reloaded into the chip.

Accordingly, what is needed is a flexible and secure approach to use a secure programmable microcontroller to support various security architectures and their encryption algorithms and incorporate these into the emulation of different instances of TPM hardware. The present invention addresses such a need.

SUMMARY OF THE INVENTION

The invention of the present application relates to applications provided on security processors provided in computer systems. In one aspect of the invention, a method for providing a security processor includes receiving a plurality of values, each value identifying a different application that can be executed on the security processor. A different certified endorsement key is associated with each received value by storing the endorsement keys and values in memory accessible by the security processor, where at least one of the stored endorsement keys and associated values is used to allow one of the different applications to execute on the security processor.

In another aspect of the invention, a security processor apparatus includes a processor and a memory coupled to the processor and operative to store a secure table. The secure table stores a plurality of different certified endorsement keys and a plurality of different values, each value associated with one of the endorsement keys. Each stored value is derived from a different application that is certified by the associated endorsement key to be executed on the processor.

In another aspect of the invention, a method for securely providing applications on a security processor includes receiving a request to load a requested application on the security processor, and comparing a value obtained from processing the requested application to at least one of a plurality of stored values stored in a memory of the security processor. A match between a stored value and the value indicates that the requested application is certified to execute on the security processor. The requested application is executed on the security processor if a match is found between the value and a stored value.

In another aspect of the invention, a computer system includes an input device operative to provide input received from a user to the computer system, the input device including a security input device identifying the user. A security processor is coupled to the input device and operative to receive the input from the user and to run applications certified for the processor. A memory coupled to the security processor is operative to store a secure table, the secure table storing a plurality of different certified endorsement keys and a plurality of different hash values. Each hash value associated with one of the endorsement keys, where each hash value is derived from a different application that is certified by the associated endorsement key to be loaded on the processor. The different applications include different security architecture applications that each can implement a different security architecture on the security processor.

The present invention provides a security processor that provides flexibility in supporting various certified security architectures and their algorithms, and allows a user to select the applications to execute on the processor. This allows a provider to produce one kind of processor that can satisfy the needs of many different users who may wish to use different architectures and algorithms. The present invention also allows an application to be unloaded from and loaded to a security processor, and installed for a security processor, while maintaining security and recent updates to the application.

DETAILED DESCRIPTION

The present invention relates to securely protecting computer data, and more particularly to security processors provided in computer systems to implement security features. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems and methods provided in particular implementations. However, one of ordinary skill in the art will readily recognize that these methods and systems will operate effectively in other implementations. For example, the computer system implementations usable with the present invention can take a number of different forms.

To more particularly describe the features of the present invention, please refer to FIGS. 1-5 in conjunction with the discussion below.

Figure 1:
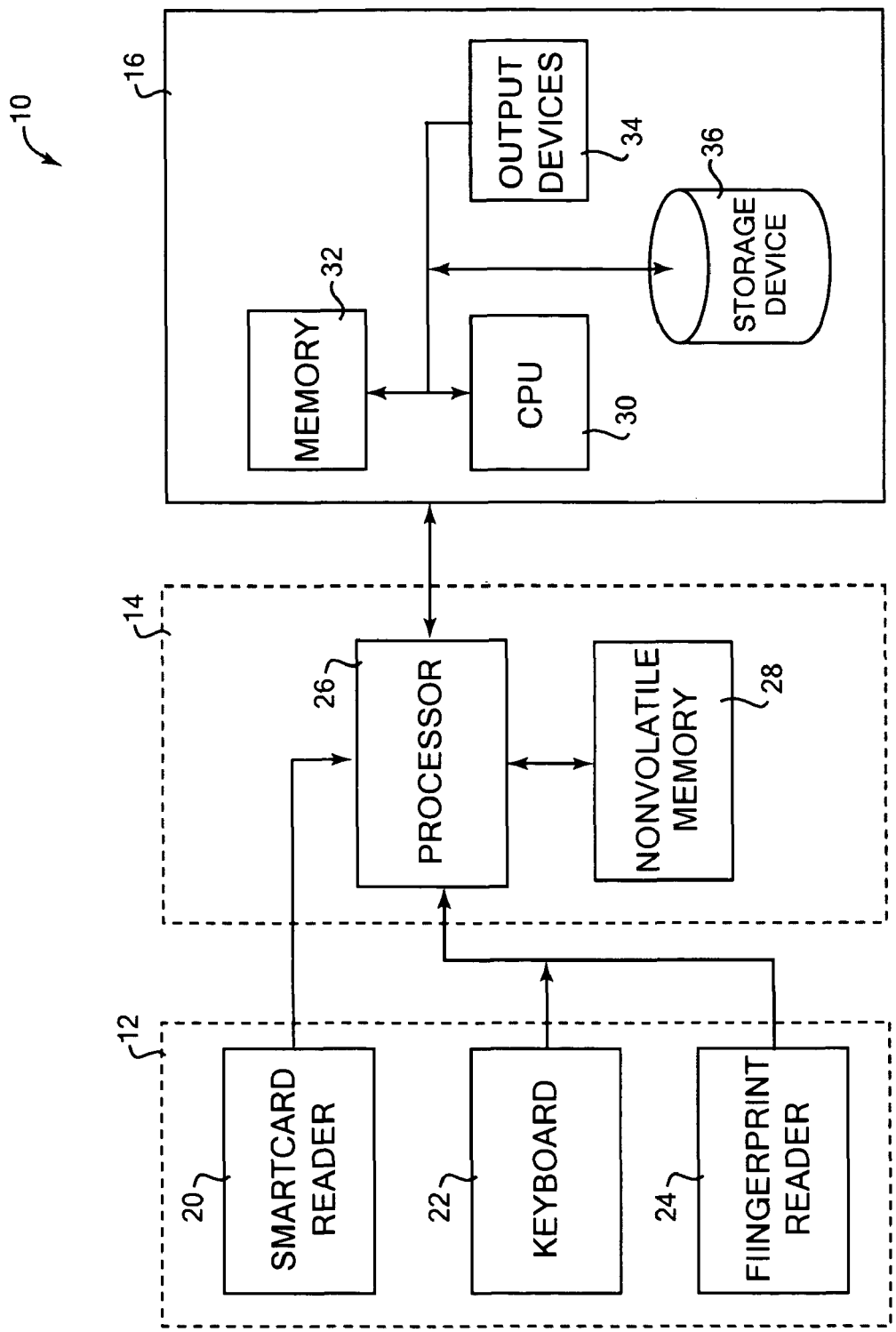
FIG. 1 is a block diagram illustrating a computer system 10 suitable for use with the present invention.

FIG. 1 is a block diagram illustrating a computer system 10 suitable for use with the present invention. System 10 is a computer system having any of a variety of forms. For example, the computer system 10 can be a mainframe computer, desktop computer, workstation, portable computer, or electronic device. System 10 includes a security architecture such as a Trusted Platform Module (TPM) from the Trusted Computing Group (TCG), or other security system suitable for use with the present invention, for securing data and functions of the system 10 from unauthorized access and manipulation. System 10 includes an input portion 12, a security portion 14, and a standard portion 16.

Input portion 12 can include a variety of different input devices which allow a user to input data to the system 10 and authenticate the user's identity to the system. For example, in the embodiment shown, a card reader 20, keyboard 22, and/or fingerprint reader 24 can be included in the system 10. Card reader 20 can read magnetic or processor cards such as smart cards, which can include secure information identifying the user and storing associated information for the user. Keyboard 22 can be used to input a password that identifies the user. The fingerprint reader 24 can read the unique fingerprint pattern of a user to identify the user. These input devices thus can be used for user authorization purposes, allowing access to secured data of system 10 to authorized users. Herein, the term "user" is meant to refer to any user of the system 10, whether authorized or not. The term "owner" in the TPM standard is used to refer to a user who loaded a particular TPM architecture and has the highest authorization to access that architecture.

Security portion 14 of system 10 is used to secure the data and applications of the system for access and use only by authorized users. In the described embodiment, a programmable security processor 26 included in the system is dedicated to security functions (and in some embodiments also may be used for other functions). The processor can execute various applications loaded onto the processor. The processor 26 typically implements a "security architecture" which, as used herein, refers to the particular security features and functions (e.g. API functions, algorithms) implemented for the system 10 as determined by a security architecture application loaded on the processor 26. An instance of a security architecture, normally implemented in hardware, can be emulated in software in the present invention to allow different architectures to be supported on processor 26.

For example, processor 26 can implement a TPM security architecture, which is a well-known standard for securing computer data. A TPM architecture is implemented on a secure, dedicated chipset incorporated into a motherboard or other circuitry of a computer by the manufacturer. In other embodiments, the TPM architecture can be implemented in another existing chip of the computer system 10. Other embodiments may use a different standard or proprietary security architecture to implement security features. The typical security functions of a TPM include random number generation, secure generation of cryptographic keys, secure storage, abilities to limit the use of keys (such as for signing and verification), and/or encryption and decryption. For example, in one embodiment the processor 26 can be an H8 processor that runs a Java Card Open Platform (JCOP) operating system from IBM Corporation, a well-known operating system implementing many security features suitable for use with the present invention. A TPM application can be loaded into the processor 26 and implemented by the JCOP operating system to enable the security architecture.

Processor 26 can typically be loaded with different security architectures, where each architecture may use different security algorithms and keys associated with that architecture, and may implement a different set of security functions. In the present invention, different security architectures can be loaded on the processor 26 from the portion 16 of the system 10 (or other secure source).

In addition, other applications not implementing a security architecture can be loaded and run on processor 26. These applications may be "bound" to a particular security architecture, referring to the dependency of an application on a particular security architecture being loaded in the processor 26. Such features are described in greater detail below.

A nonvolatile memory 28 is included in security portion 14 and is connected to the processor 26. For example, memory 28 can be Flash memory, Electrically Erasable Programmable Read Only Memory (EEPROM), or other type of memory. In the described embodiment, memory 28 is a secure memory which cannot be easily tampered with to read its data contents. In some embodiments, the nonvolatile memory 28 can be included on the same integrated circuit chip, or package, of the processor 26.

In the present invention, nonvolatile memory 28 stores a secure table of hash values and endorsement keys which are used to determine whether applications to be loaded on the processor 26 are authorized, and enables flexible and secure support of various different security architectures and programs on processor 26, as described in greater detail below. The memory 28 also stores an other secure data pertinent to performing the security functions of the processor's security architecture. The non-volatile memory can also in some embodiments be used to store a loaded security architecture and/or application loaded in processor 26.

In other embodiments, additional memory (not shown) can be connected to the processor 26 to store a loaded security architecture, loaded applications, or other programs. For example, secured random access memory (RAM), additional nonvolatile memory, etc., can be connected.

A standard portion 16 of system 10 is connected to the processor 26 and includes remaining standard components of the system. Such components typically include a microprocessor or CPU 30, memory 32 (random access memory (RAM), read-only memory (ROM), etc.), output devices 34 (video monitor, audio speakers, printer, etc.) and other typical computer components. The microprocessor can interface with memory devices and other components to control the operation of the system 10, including performing data manipulation, computation, input/output, and other typical functions.

A storage device 36, such as a hard disk drive, is also typically included to store data and applications to be used by the system 10. In the present invention, applications such as security applications to be loaded into processor 26, as well as other applications used by the processor 26 and microprocessor 30, can be stored securely on storage device 36 using encryption and other security methods. In other embodiments, a different storage device 36 can be used instead of hard disk drive, such as memory, magnetic tape, optical storage (CD-ROM, DVD-ROM), etc. In the described embodiment, the standard portion 16 of system 10 is connected to the processor 26, and the input portion 12 is connected to the processor 26, so that input provided to the portion 16 can first be examined by security portion 14 for authentication and security.

Figures 2, 3:
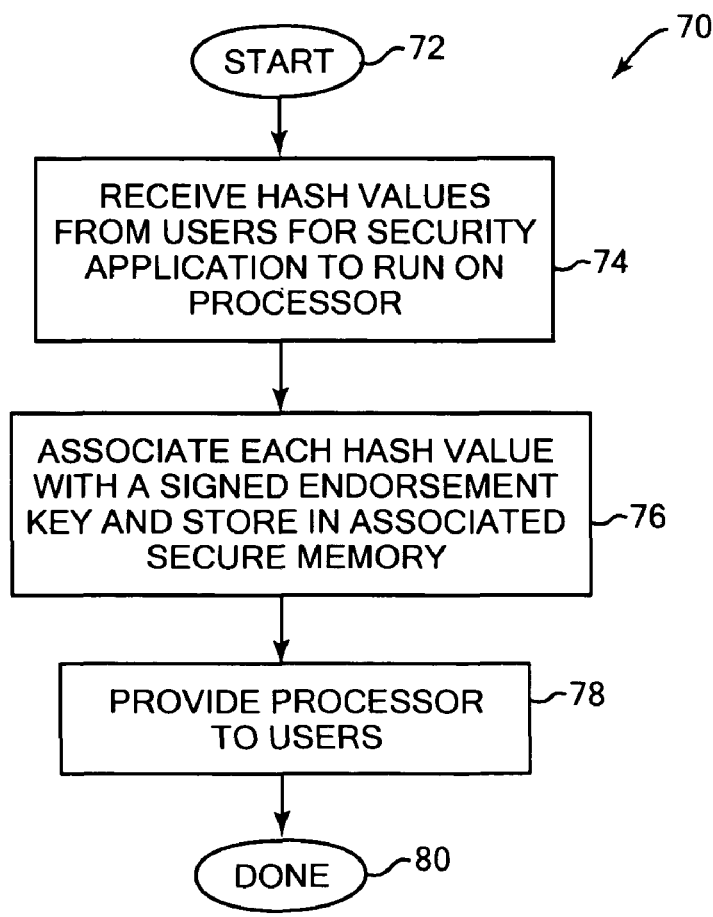
FIG. 2 is a diagrammatic illustration of a secure table of the present invention that can be stored in nonvolatile memory connected to the security processor of FIG. 1.
FIG. 3 is a flow diagram illustrating a method of the present invention for preparing and providing a security processor for users.

FIG. 2 is a diagrammatic illustration of a secure table 50 of the present invention that can be stored in nonvolatile memory 28 connected to security processor 26. Table 50 can store information related to allowing certified applications to execute on the processor 26 and determining which type of security architecture is to be loaded and executed.

In the described embodiment, table 50 includes a number of endorsement key (EK) values 52. For example, in the TPM standard, an endorsement key (e.g., generated randomly for a TPM architecture at manufacture time) is used to allow the execution of secure transactions and to recognize a genuine TPM architecture to be loaded into the processor 26. The endorsement key is a key pair including a public key and a private key; the private portion of the endorsement key can be stored in the table 50. Alternatively, the public and private portions of the endorsement keys can be stored in table 50. Although the term "endorsement key" is used in the TPM standard for use with TPM architectures, this term is used generically herein for similar use in any standard and can be used with any application.

After generating an endorsement key for an application, the provider (or other authorized entity) publishes a certificate that includes the public portion of the endorsement key and provides information identifying the application that is associated with the endorsement key. For example, this information can be a hash value of the application, or can otherwise describe the application (e.g., for a security architecture application, specifying the algorithms used, etc.) The provider signs the certificate using a private portion of a provider key, which allows a public portion of that provider key to be used to verify that the certificate information is authentic and from that provider. Thus, for example, the certificate can testify that an identified TPM architecture is a particular type of TPM architecture using an associated set of encryption and decryption algorithms.

In the present invention, multiple endorsement key values 52 for multiple endorsement keys are stored in the table 50 to allow any of multiple different security architectures or applications to be loaded on the processor 26. Each endorsement key in table 50 is unique and is associated for use with a particular application as specified in a published certificate.

The table 50 also stores hash values 54, where each hash value is associated with a corresponding stored endorsement key value 52. A hash value 54 is the result of a cryptographic hash function applied to a particular application and/or data and uniquely identifies the hashed application/data. The association of the hash value with an endorsement key value 52 by the provider indicates that the application/data has been authorized and certified for use on this processor 26. The particular hash algorithm(s) used to generate the hash values in column 54 are associated with and depend on the particular security architecture used.

For example, the provider of the processor 26 of the present invention can store the endorsement key values in the table 50, each of which are associated with a certificate authorizing and specifying a different type of security architecture for use on processor 26. The provider can also store the hash values of the applications that the manufacturer has authorized and certified for use with the stored endorsement keys on this processor 26. In addition, a user may be able to store new hash values in table 50, and/or new endorsement keys associated with a certificate signed by the user. These features are described in greater detail below.

FIG. 3 is a flow diagram illustrating a method 70 of the present invention for preparing and providing a security processor 26 for users. The method 70 is for use by a manufacturer of the processor 26, or an authorizing entity which can provide certified endorsement keys in a processor 26; all such manufacturers or authorizing entities are generally referred to herein as "providers" of the security processor 26.

The method starts at 72, and in step 74, the provider receives hash values from the users (e.g., customers) who wish to use the processor 26. Each hash value represents the particular application (such as a security architecture application like a TPM application), and any associated data, that is desired to be loaded and run on the security processor 26. Each hash value has been obtained using a hash algorithm that can remain unknown to the provider; thus, the implementation of the application and the algorithms used by the application can remain unknown to the provider, as desired by some users. Alternatively, the provider can apply hash algorithms to applications desired to be supported by the processor 26 to obtain some or all of the hash values.

In step 76, the provider associates each different hash value with an endorsement key generated on the processor 26 for that hash value (e.g., a random number can be signed by the processor 26 to form the endorsement key pair), and the endorsement key and hash value are stored. The public portion of the endorsement key can be provided in a certificate that is published by a certifying authority. For each different hash value, an endorsement key value and the associated hash value are stored in the secure table 50 of the secure nonvolatile memory 28 that is connected to the processor 26. The endorsement key value stored can be the private portion of the endorsement key (or alternatively the public portion or both portions). Each endorsement key can be different for hash value; or, in alternate embodiments, the same endorsement key can be used for multiple hash value entries. Each stored hash value identifies a different application desired by the user; if two or more users have provided the same hash values in step 74, then only one hash value and endorsement key need be stored in the table 50 for that application. In some embodiments, different instances of the same application may provide different hash values (e.g., when having different settings, data, etc.), so that each different instance can have a corresponding different hash value and endorsement key entry stored in the secure table 50. Applications that are bound to a particular security architecture can be indicated as having that relationship in the security table 50 by any of various methods, e.g., the bound application has a hash value that includes a link or pointer to the required security architecture application, other status indicator or pointer, etc. In some embodiments, an additional identifier can be stored in each entry of the secure table 50, used to match the entry to a requested application as described below.

In step 78, the provider provides the processor 26 to the users (or causes the processor 26 to be provided to the users). The processor 26 can be included in a computer system 10 that is provided to the users. The user can then load his or her desired application(s) on the processor 26, as described in greater detail with respect to FIG. 4. The process is then complete at 80.

In some embodiments, the provider can also store additional certified endorsement key values in the table 50 which are not yet associated with any hash values. This allows a user to load his or her own hash value and associate it with a stored, certified endorsement key. In some embodiments, the provider can also allow a user to store his or her own endorsement keys and hash values in the table 50.

With the method of FIG. 3, the present invention allows a provider to provide a security processor in a computer system without the provider knowing the particular implementation and/or algorithms of an application to be loaded on the processor 26. A user need not have given out any of the actual applications or algorithms that the user wishes to implement in or use with the desired security architecture, and need only give the hash values to the provider. This allows the provider to authenticate applications authorized for use with the processor 26 by associating each application hash values with an endorsement key.

The present invention allows the provider to save the manufacturing costs of providing a different processor 26 for each type of security architecture desired by the provider's customers. The provider can store a hash value and endorsement key for multiple different types of security architectures (or other applications), where the user will select his or her desired architecture by hashing a security architecture application upon load, which will match with the proper hash value and endorsement key in the table 50. The provider can thus provide identical processors 26 to all users and let the user select the desired security architecture or application and thus the particular algorithms that are associated with that application.

Figure 4:
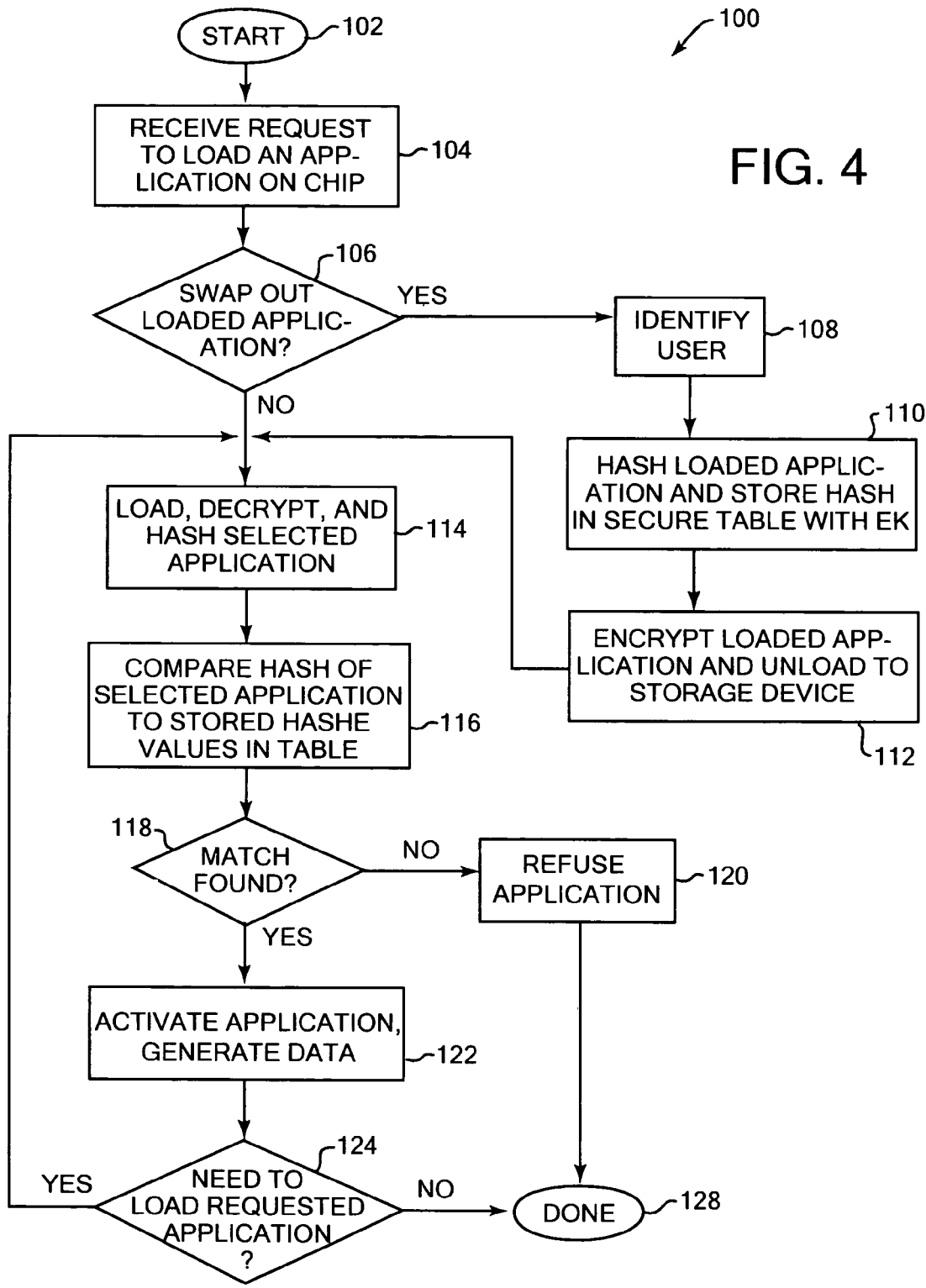
FIG. 4 is a flow diagram illustrating a method of the present invention for loading an application into a security processor.

FIG. 4 is a flow diagram illustrating a method 100 of the present invention for loading an application into a security processor 26. Method 100 (and method 200, below) can be implemented by the processor 26 using an application running under an operating system of the processor 26. Alternatively, methods 100 and/or 200 can be implemented using hardware (circuitry, logic gates, etc.), or a combination of hardware and software. Program instructions implementing all or part of the present invention can be stored on and be accessible from a computer readable medium, such as an electronic, magnetic, optical, electromagnetic, infrared, or semiconductor medium, and examples of which include memory (random access memory (RAM), a read-only memory (ROM), etc.), hard disk drive, optical disk (CD-ROM, DVD-ROM, etc.).

The method begins at 102, and in step 104, the processor 26 receives a request to load an application into the processor 26. This application is typically securely stored in a storage device such as the hard disk drive 36 or other device, e.g., in encrypted form, or may be provided from some other source, such as a connected computer network. This request can include an identification of the application desired to be loaded and the size of the application. For example, an existing hash value of the encrypted application can be provided as a signature in the application file, and/or another identifier or reference to a particular file that holds the application can be used. For example, the request may be to load a TPM application into the processor 26 which currently has no TPM architecture loaded. In another example, the request may be to load a TPM application on the processor 26 to install an architecture that will replace a different currently-loaded TPM architecture. In still another example, the request may be to load a non-TPM application into the processor 26. The request can be received, for example, when an application load request is sent to the storage device 36 (or other source) that provides the application to be loaded; this load request can be intercepted by a filter driver of the operating system of the processor 26. For example, the application specified in the load request can be identified by comparing it to the applications listed in secure table 50, e.g., a hash value in the encrypted application file can be compared to the hash values in table 50, or a different application identifier can be compared to identifiers stored in the table 50.

In next step 106, the process checks whether the requested load requires the processor to swap out a currently-loaded application (including, in some cases, a loaded security architecture). Typically, if the requested application requires more memory to run than is currently available for the processor 26, a currently-loaded application of processor 26 may need to be unloaded. Or, if the requested application is a security architecture application and there is a different security architecture currently loaded, the loaded security architecture would need to be removed, since in some embodiments only one security architecture may be running on processor 26 at one time. In other alternate embodiments, the processor 26 may be able to run two or more security architectures simultaneously, in which case a different currently-loaded security architecture would not need to be unloaded (unless the user requested it), if sufficient memory is available. In other embodiments, the loaded security architecture may be designated as "single use", and/or the processor 26 may have a "fuse" or flag set in hardware or software, indicating that a currently-loaded security architecture is not allowed to be unloaded from the processor 26. The check of step 106 can include, for example, a check whether the requested application is bound to (required to run under) a particular security architecture that is not currently-loaded (e.g., by checking for any such bound links in table 50). Some application may not be bound to, and can execute in parallel with, any security architecture.

If a currently-loaded application is to be unloaded from the processor, then the process continues to an optional step 108, in which the user is identified. For example, the user can be requested by the operating system of the processor 26 to identify themselves in a secured, authenticated fashion, such as by inserting a smartcard into smartcard reader 20, the smartcard storing data identifying the user; or by contacting the fingerprint reader 24 with a finger; or by entering a password using keyboard 22; or by another secure identification technique (or by any combination of these). The requested load may depend on the identity of the user; for example, only the owner of a TPM processor 26 could be allowed to swap TPM architectures or load an application. If an appropriate user is not identified in step 108, the method 100 is aborted. In other embodiments, no user identification step need be performed.

The process continues to step 110, in which the currently-loaded application and any associated data is hashed according to a known cryptographic hash algorithm, and the hash value is stored in the secure table with this application's associated endorsement key. Any previously-stored hash value for this application stored in the table can be written over with the current hash value. The current hash value may be different than the previously-stored value because of changes that may have occurred to the application or its data since the previous hash value was stored. For example, there may be new passwords and/or a new storage root key (SRK) associated with a TPM application different from passwords or SRK that were included in a previous hash value of that application. Thus the present invention can prevent unauthorized older versions of the application to be loaded and executed on the processor 26, since only the latest version will match with the hash value stored in the table 50 when loading an application (see steps 116-118 below). In some embodiments, the original hash value for an application can be maintained in the secure table 50; for example, this can allow the original form of an application to be re-installed, if authorized.

In next step 112, the process encrypts the loaded application using the encryption algorithm(s) associated with the application's security architecture. For example, a symmetrical algorithm can be used for encryption. In addition, the hash value created from this application and stored in table 50 in step 110 can also be stored in the encrypted file of this application, to identify and use when loading the application, for example. The encrypted application is stored in a storage device 36 of the system 10, such as a hard disk drive. The process then continues to step 114.

If in step 106 it is determined that no currently-loaded application need be removed from the processor 106 to load the requested application, then the process continues to step 114. Step 114 can also be performed after or during a currently-loaded application has been unloaded and archived in storage as described above for steps 108-112. In step 114, the selected application is loaded into memory of processor 26 (such as non-volatile memory 28 or other available memory), is decrypted using appropriate algorithms associated with the security architecture of the requested application, and is hashed using an appropriate cryptographic hash function associated with the security architecture of the requested application (for example, the application, and thus its decryption and hash algorithms, can be identified via a lookup in secure table 50 as explained above).

The hash is performed using hash algorithm(s) to obtain a hash value that identifies this particular application and data. For example, a standard hash algorithm used for the TPM standard is the SHA-1, SHA-256, or similar algorithm, and an encryption/decryption algorithm used is the Advanced Encryption Standard (AES).

The "selected application" processed in step 114 can be the requested application of step 104, or a different application, depending on the situation. For example, the selected application may be the application requested to be loaded in step 104. Or, if the requested application is a non-security-architecture application which requires a security architecture not currently loaded, the selected application may be the required security architecture application (such as a TPM application), then, in a later iteration of step 114, the selected application is the requested application.

In next step 116, the process compares the obtained hash value of the selected application to one or more stored hash values in the secure table 50. In step 118, the process checks whether a match has been found between the obtained hash value and a hash value in the table. If no match is found after comparing to all hash values in the table 50, the process continues to step 120 to refuse the selected application (e.g., not activate the application, and unload it from memory), and the process is complete at 128.

If a match is found for the hash value, then the selected application is known to be associated with a certified endorsement key stored in the table, and thus the application is certified and authorized to be loaded and used on this particular processor 26. As explained above, each endorsement key is associated with a public certificate describing/identifying the application (such as by providing the hash value for the application); thus the application specifications (such as the algorithms used, unless secret) are known from the endorsement key in table 50.

If, for example, the selected application had been previous unloaded as described above in steps 108-112, an updated hash value of the current version of the application was stored in the table 50. Thus the unloaded application will match the hash value in the table 50 when it is re-loaded, and older versions of the application will not match, providing additional security.

In step 122, the selected application is activated on the processor 26, thus allowing the application to execute and be accessed by a user. If the selected application is a security architecture application such as a TPM application, the new architecture is activated. For example, the endorsement key (EK) that is associated with the matching hash, as stored in the table 50, is set or loaded into the processor 26 as the active endorsement key. In addition, any other data needed for initializing the application can be generated or loaded into memory of processor 26; for example, when a TPM architecture is activated, a storage root key (SRK) can be generated and stored in secure nonvolatile memory 28, and the user can access the TPM architecture and become its "owner."

In step 124, the process checks whether the requested application still needs to be loaded. This can occur, for example, when the requested application of step 104 is a non-security-architecture application which requires (is bound to) a security architecture different from the architecture currently loaded; in such a case, the first application activated in step 122 is the required security architecture application. Thus, if the requested application still needs to be loaded at step 124, the process returns to steps 114-122 to hash the requested application, determine if it is authorized to be loaded, and activate the application. If the requested application has been loaded and activated at step 124, then the process is complete at 128.

It should be noted that many of the steps of FIG. 4 need not be performed in the order shown. For example, the process can first check whether the hash value of the selected or requested application matches a hash value in the table 50 in steps 116-118, before any currently-loaded applications are unloaded from the processor in steps 108-112, if sufficient memory is available to perform the steps in this order.

Figure 5:
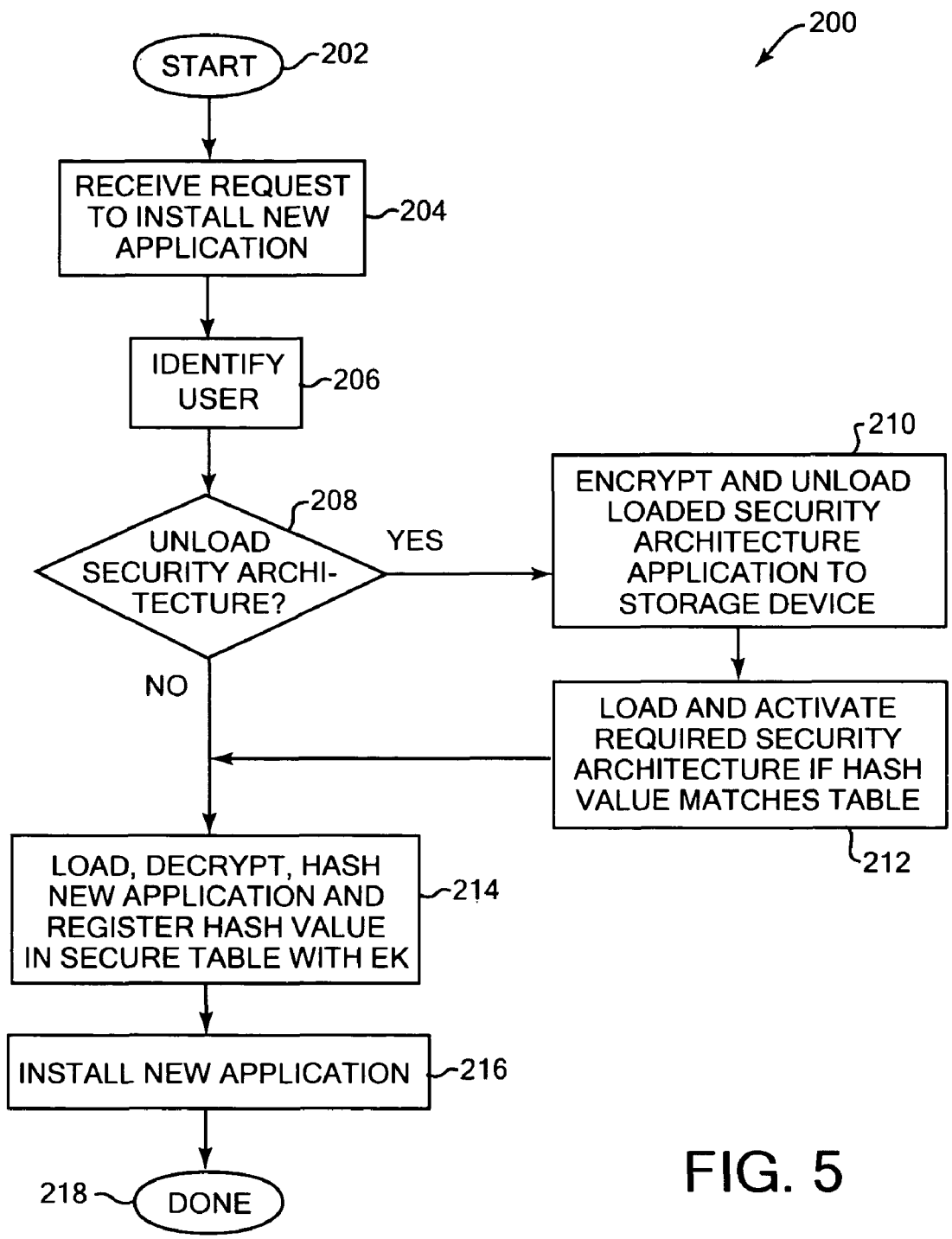
FIG. 5 is a flow diagram illustrating a method of the present invention for installing a new application for use by a security processor.

FIG. 5 is a flow diagram illustrating a method 200 of the present invention for installing a new application for use by processor 26. The method starts at 202, and in step 204, the processor 26 receives a request to install a new application. This can occur when a user wishes to install an application on a storage device (such as hard disk drive 36), and the application can be loaded on and run by the processor 26. The application to be installed can be a non-security-architecture application which can take advantage of the security features of the processor 26 and its operating system. For example, applications for implementing or interfacing with a Subscriber Identity Module (SIM) card for cellular phones or secure ID cards, or applications for implementing fingerprint matching of users, may be desired to be installed for use by the processor 26 and its security-enhanced operating system and memory storage. The request can be detected, for example, when an application write request is sent to the storage device 36 that will store the new application; this write request can be intercepted by a filter driver of the operating system of the processor 26.

In the request to install an application, identifying information and the size of the application can be provided. In optional step 206, the user can be identified, similar as in step 108 as described above with respect to FIG. 4, to determine if the user is authorized to install new applications for processor 26.

In some embodiments step 208 is performed, in which the process checks whether or not to unload the currently-loaded security architecture and replace it with a different security architecture. This check can be performed, for example, by checking the write request intercepted by a processor's filter driver, and can include, for example, comparing the application to the secure table 50 for a match to applications bound to the currently-loaded security architecture, similarly as described above for FIG. 4. For example, some bound applications may use keys or other features that are specific to a particular security architecture, and thus can be installed only under that architecture. Thus, if the new application is bound to a different security architecture than the one currently loaded, the currently-loaded security architecture should be unloaded and the required security architecture loaded. Step 208 can be skipped in those embodiments not allowing a security architecture to be unloaded or changed. In other, alternate embodiments allowing two or more security architectures to be simultaneously run in the processor 26, the check of step 208 might not need to be performed nor a security architecture to be unloaded.

If the loaded security architecture should be unloaded (e.g., the new application is not bound to the currently-loaded security architecture), the process continues to step 210, in which the loaded security architecture application is hashed, encrypted and unloaded to a storage device 36. This step is similar to steps 108-112 for FIG. 4 as described above. In step 212, the required security architecture (to which the new application is bound) is loaded, decrypted, compared to the hash values in the table, and activated. This step is similar to steps 114-124 of FIG. 4 as described above. Once the new architecture is activated, the process continues to step 214. As in FIG. 4, if the hash value of the new security architecture does not match a hash value in the table 50, the new architecture application will not be loaded and the process terminates.

If in step 208 the loaded security architecture is not to be unloaded (e.g., the new application is bound to the currently-loaded security architecture), or the required security architecture has been loaded in steps 210-212, then the process continues to step 214, in which the new application is loaded into memory of the processor 26 (e.g., from any source connected to the computer system 10, e.g., disk, optical storage media, network, etc.). If the new application was encrypted, it is decrypted using algorithms associated with the security architecture (or associated with the security architecture bound to the application), and the new application is hashed using an hash algorithm associated with that security architecture (e.g., algorithms identified via a identifier or existing hash value stored in the application file, similar to FIG. 4). The resulting hash value is registered in the processor 26 by storing the resulting hash value in the secure table 50 associated with an endorsement key. This endorsement key can already exist in the table as an unassociated key that was provided and stored by the processor provider, to be associated with applications newly installed by the user. Or, the endorsement key can be newly generated by the operating system of the processor 26, by generating a private portion of the endorsement key and storing it in table 50, and generating a public portion of the key which it publishes or provides to the user. For example, an operating system such as JCOP can have its own endorsement key, where the operating system can generate the new endorsement key for the application and sign the public portion of the key using the private portion of its own endorsement key. Alternatively, the user can sign the public portion of the new endorsement key and provide a certificate.

After registration of the new application, in some embodiments the entire secure table 50 can be re-signed using the endorsement key of the operating system of the processor 26, indicating the table is secure.

In step 216, the new application is encrypted using associated encryption algorithms and installed or stored in memory of the processor 26 or a storage device 36 of system 10. The process is then complete at 218.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a security processor, the method comprising:

receiving a plurality of different values at a security processor of a computer apparatus, each value identifying an associated different security architecture application that is authorized to be executed on the security processor, the security processor being operative to implement at least one of the security architecture applications, each of the security architecture applications operative to perform security functions enabling trusted computing features that secure information for use on the computer apparatus, wherein each different security architecture application is operative to implement a different security architecture on the security processor, wherein each different security architecture is associated with at least one different encryption algorithm; and associating a different certified endorsement key with each received value by storing the endorsement keys and values in a secure memory of the computer apparatus, the secure memory being accessible by the security processor, wherein at least one of the stored endorsement keys and associated values is used to authorize and allow a requested security architecture application to execute on the security processor in response to the requested security architecture application being determined by the security processor to match one of the different security architecture applications associated with the stored values, and wherein the requested security architecture application is not allowed to execute on the security processor if it does not match any of the different security architecture applications.

2. The method of claim 1 wherein each different security architecture is associated with at least one different hash algorithm.

3. The method of claim 2 wherein each stored received value is a hash value derived from applying a hash algorithm to the application identified by the hash value, wherein the requested security application is authorized and allowed to execute on the security processor in response to determining that a hash value obtained by hashing the requested security application matches at least one of the stored received values.

4. The method of claim 1 wherein the security architecture applications include Trusted Platform Module (TPM) applications that each can implement a different TPM architecture on the security processor.

5. The method of claim 1 further comprising:
receiving a plurality of different application values that each identify a different bound security application, each of the security applications not implementing a security architecture and bound to at least one of the security architectures; and
associating a different certified endorsement key with each received application value by storing the endorsement keys and application values in a secure memory of the computer apparatus, the secure memory being accessible by the security processor, wherein at least one of the stored endorsement keys and associated application values is used to authorize and allow a requested bound security application to execute on the security processor in response to the requested bound security application being determined by the security processor to match one of the different bound security applications associated with the stored application values.

6. The method of claim 1 wherein the endorsement keys and associated values are stored in a secure table in the secure memory accessed by the security processor, wherein the security processor and secure memory are provided on a security portion of the computer apparatus that is separate from a main processor and main memory of the computer apparatus.

7. The method of claim 1 further comprising storing at least one additional certified endorsement key in the secure memory without an associated value, wherein the additional certified endorsement key can be associated by a user with a value provided by the user.

8. A security processor apparatus comprising:
a security processor, the security processor being operative to secure information for use on a computer processor connected to the security processor apparatus; and
a secure memory provided in the security processor apparatus and coupled to the security processor and operative to store a secure table, the secure table storing a plurality of different certified endorsement keys and a plurality of different values, each value associated with one of the endorsement keys, wherein each stored value is derived from and identifies an associated different security architecture application that is certified by the associated endorsement key to be executed on the security processor, each of the security architecture applications operative to perform security functions enabling trusted computing features that secure information for use on the computer apparatus,
wherein each the different security architecture applications is operative to implement a different security architecture on the security processor, each different security architecture employing a different set of encryption and decryption algorithms,
wherein the security processor uses the endorsement keys and associated values to determine whether a requested security architecture application matches one of the different security architecture applications associated with the stored values in order to authorize and allow the requested security architecture application to execute on the security processor, and wherein the requested security architecture application is not allowed to execute on the security processor if it does not match any of the different security architecture applications.

9. The security processor apparatus of claim 8 wherein each different security architecture employs at least one different hash algorithm.

10. The security processor apparatus of claim 8 wherein the security architecture applications include Trusted Platform Module (TPM) applications that each can implement a different TPM architecture on the security processor.

11. The security processor apparatus of claim 8 wherein the secure table stores a plurality of different application values that each identify a different bound security application, each of the bound security applications not implementing a security architecture and bound to at least one of the security architectures, wherein a different certified endorsement key is associated with each stored application value, wherein the security processor uses at least one of the stored endorsement keys and associated application values to determine whether a requested bound security application matches one of the different bound security applications associated with the stored application values in order to authorize and allow the requested bound security application to execute on the security processor, and wherein the requested bound security application is not allowed to execute on the security processor if it does not match any of the different bound security applications.

12. The security processor apparatus of claim 8 wherein each of the different values is a different hash value, each hash value derived from a different security architecture application by applying a hash algorithm to that security architecture application.

13. The security processor apparatus of claim 12 wherein when the requested security architecture application is to be loaded on the security processor, the security processor compares a hash value obtained from hashing the requested security architecture application to the hash values stored in the secure memory, wherein the requested security architecture application is certified and allowed to execute on the security processor in response to the hash value for the requested security architecture application matching at least one of the stored hash values, and wherein the endorsement key associated with the matching received value is activated in the security processor as an active endorsement key.

14. The security processor apparatus of claim 13 wherein in response to a loaded security architecture application is to be unloaded from the security processor based on a request of a user to load a requested security architecture application on the processor, the security processor is operative to hash the loaded security architecture application to obtain a new hash value, store the new hash value in the secure table for the loaded security architecture application, and encrypt and store the loaded security architecture application to a storage device coupled to the security processor.

15. The security processor apparatus of claim 8 wherein the security processor and secure memory are provided on a security portion included in a computer apparatus, the security portion being separate from the computer processor and a main memory of the computer system.

16. The security processor apparatus of claim 8 wherein the secure memory stores at least one additional certified endorsement key in the secure memory without an associated value, wherein the additional certified endorsement key can be associated with a hash value provided by a user.

17. A method for securely providing applications on a security processor, the method comprising:
  receiving a request to load a requested security application on a security processor of a computer system, the security processor being operative to implement at least one of a plurality of different security architecture applications, each of the different security architecture applications operative to perform security functions enabling trusted computing features that secure information for use on the computer system,
  wherein each the different security architecture applications is operative to implement a different security architecture on the security processor, each different security architecture employing a different set of encryption and decryption algorithms;
  comparing a value obtained from processing the requested security architecture application to at least one of a plurality of stored values stored in a secure memory of the security processor, each of the stored values identifying an associated one of the different security architecture applications, wherein a match between a stored value and the value indicates that the requested security architecture application is certified to execute on the security processor; and
  executing the requested security architecture application on the security processor if a match is found between the value and a stored value, and not allowing the requested security architecture application to execute on the security processor if the match is not found.

18. The method of claim 17 wherein each value stored in the secure memory is associated with a different certified endorsement key stored in the secure memory.

19. The method of claim 18 wherein the value is a hash value obtained from hashing the requested security architecture application and the stored values are hash values obtained by applying a hashing algorithm to the associated different security architecture applications.

20. The method of claim 19 further comprising:
  receiving a request to install a new application for use with the security processor, wherein the new application is hashed to obtain a new hash value; and
  storing the new hash value in the secure memory of the security processor, wherein the new hash value is associated with an endorsement key stored in the secure memory.

21. The method of claim 17 further comprising unloading a loaded security architecture application on the processor before loading the requested security architecture application.

22. The method of claim 21 wherein the loaded security architecture application is unloaded from the processor in response to the requested security architecture application not fitting in currently-available memory coupled to the processor.

23. The method of claim 21 wherein the loaded security architecture application is unloaded from the processor in response to the requested security architecture application requiring a different security architecture application to be executed.

24. The method of claim 21 wherein unloading the loaded security architecture application includes obtaining a new hash value by hashing the loaded security architecture application and storing the new hash value in a secure table of the secure memory.

25. The method of claim 24 wherein unloading the loaded security architecture application includes encrypting and storing the loaded security architecture application to a storage device coupled to the security processor.

26. The method of claim 25 wherein the encryption uses an encryption algorithm associated with the security architecture.

27. A computer system comprising:
  an input device operative to provide input received from a user to the computer system, the input device including a security input device identifying the user;
  a security processor coupled to the input device and operative to receive the input from the user and to run security applications certified for execution by the security processor, each of the security applications operative to perform security functions enabling trusted computing features that secure information for use on the computer system,
  wherein the different security applications include different security architecture applications that each can implement a different security architecture on the security processor, each of the different security architecture applications operative to implement a different security architecture on the security processor, each different security architecture employing a different set of encryption and decryption algorithms; and
  a secure memory provided in the computer system and coupled to the security processor and operative to store a secure table, the secure table storing a plurality of different certified endorsement keys and a plurality of different hash values, each hash value associated with one of the endorsement keys, wherein each hash value is derived from and identifies an associated different security application that is certified by the associated endorsement key to be loaded on the security processor,
  wherein the security processor uses the endorsement keys and associated values to determine whether a requested security application matches one of the different security applications associated with the stored values in order to authorize and allow the requested security application to execute on the security processor, and wherein the requested security application is not allowed to execute on the security processor if it does not match any of the different security applications.

28. The computer system of claim 27 wherein the security input device includes at least one of a fingerprint reader and a smartcard reader, and wherein the different security applications include applications not implementing a security architecture and bound to one of the different security architectures, including applications to interface to the security input device.

29. The computer system of claim 27 wherein when a requested security architecture application is to be loaded on the security processor, the security processor compares a hash value obtained from hashing the requested security architecture application to the hash values stored in the secure memory to determine whether the requested security architecture application is certified to be loaded on the security processor.

30. At least one nontransitory processor readable medium including program instructions to be implemented by a computer and for securely providing applications loaded on a security processor of a computer apparatus, the program instructions for: receiving a request to load a requested security architecture application on the security processor, the security processor being operative to implement at least one of a plurality of different security architecture applications, each of the different security architecture applications operative to perform security functions enabling trusted computing features that secure information for use on the computer apparatus:

wherein each different security architecture application is operative to implement a different security architecture on the security processor, wherein each different security architecture is associated with at least one different hash algorithm and at least one different encryption algorithm;

comparing a value obtained from processing the requested security architecture application to at least one of a plurality of stored values stored in a secure memory of the security processor, each of the stored values identifying an associated one of the different security architecture applications, wherein a match between a stored value and the value indicates that the requested security architecture application is certified to execute on the security processor; and executing the requested security architecture application on the security processor if a match is found between the value and a stored value, and not allowing the requested security architecture application to execute on the security processor if the match is not found.

\* \* \* \* \*